F. B. RAE.
POWER TRANSMISSION DEVICE.
APPLICATION FILED MAR. 15, 1918.
1,330,393.
Patented Feb. 10, 1920.
2 SHEETS—SHEET 2.
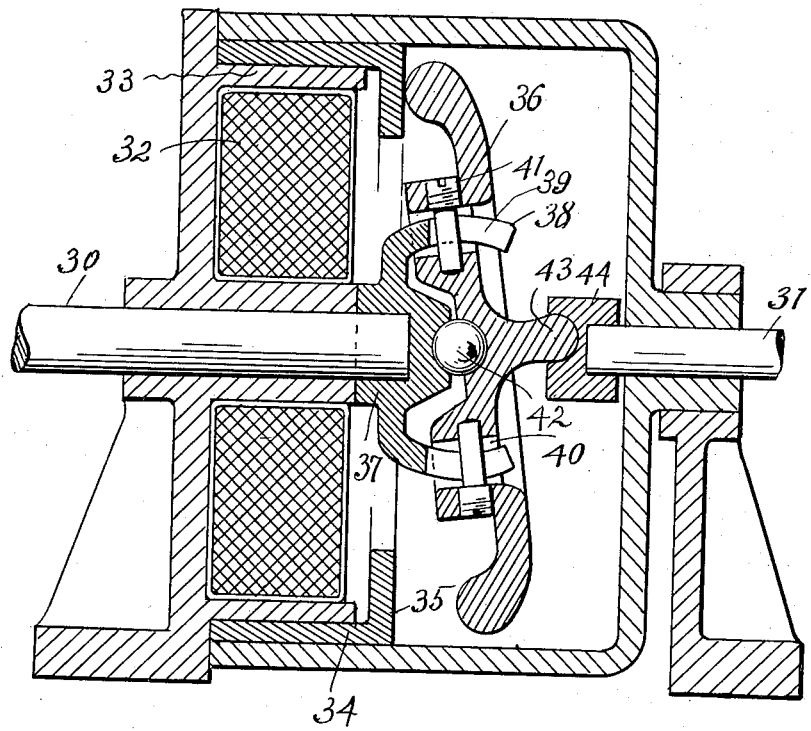
Fig. 5.
Fig. 6.
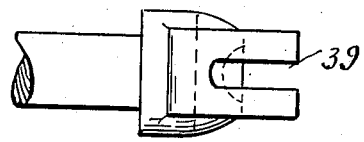
Inventor:
Frank B. Rae.
By Thurston & Rivers
attys.

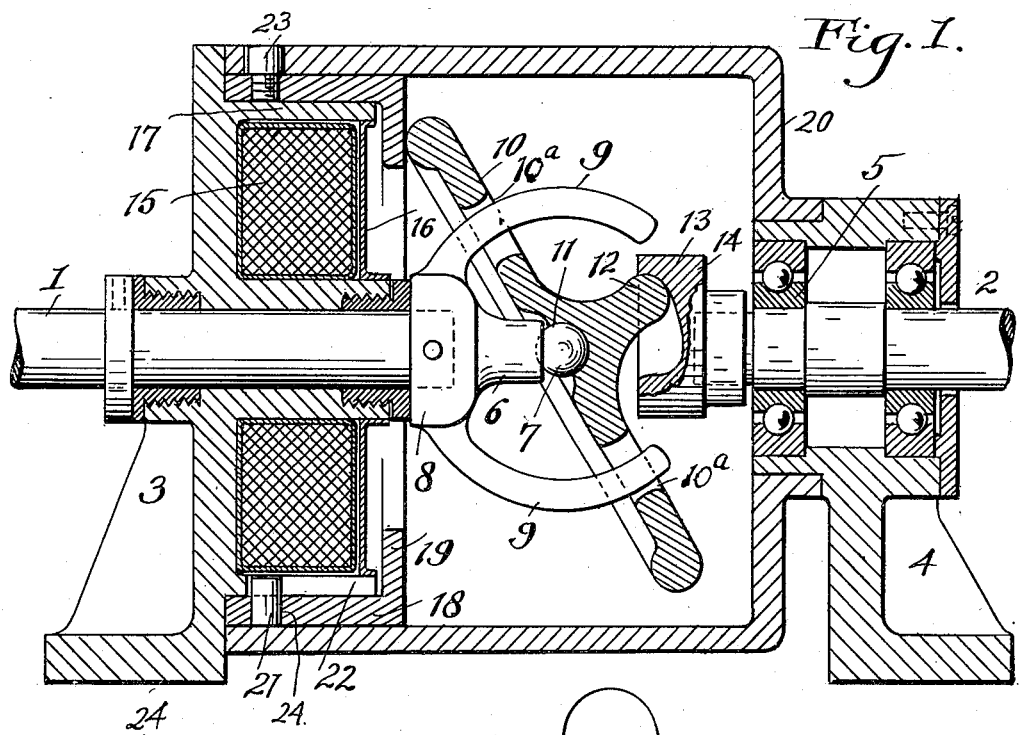

UNITED STATES PATENT OFFICE.

FRANK B. RAE, OF CLEVELAND, OHIO.

POWER-TRANSMISSION DEVICE.

1,330,393.  Specification of Letters Patent.  Patented Feb. 10, 1920.

Application filed March 15, 1918. Serial No. 222,575.

*To all whom it may concern:*

Be it known that I, FRANK B. RAE, a citizen of the United States, residing at Cleveland, in the county of Cuyahoga and State of Ohio, have invented a certain new and useful Improvement in Power-Transmission Devices, of which the following is a full, clear, and exact description.

This invention relates to a power transmission device and is adapted to be used in connection with a driving and driven shaft between which the speed relation may be changed at will, or if desired, the device is capable of being set so as to produce a fixed speed ratio between the two shafts.

The object of the invention is to provide a simple form of power transmitting device which shall be efficient for the purpose for which it is to be used.

Generally speaking, the invention may be said to comprise the elements and combinations thereof set forth in the accompanying claims.

Reference should be had to the accompanying drawings forming a part of this specification in which Figure 1 is a sectional elevation of the transmission mechanism; Fig. 2 is an end view of the casing containing the transmission; Fig. 3 is a side elevation of a portion of the casing containing the mechanism; Fig. 4 is an elevation of a portion of the mechanism; Fig. 5 is a sectional elevation showing a modified form of the mechanism; Fig. 6 is a top plan view illustrating a detail of construction of the mechanism shown in Fig. 5.

Referring more particularly to Fig. 1, there is there shown a driving shaft 1, and a driven shaft 2.

These shafts are thus indicated simply for the purpose of adopting some nomenclature upon which the description may be based, but it will be obvious that the shaft 2 may be the driving shaft, and the shaft 1 the driven shaft, if such be desired.

The shaft 1 has a bearing portion in a suitable bracket member which is generally indicated at 3, and the shaft 2 has a bearing portion in a bracket which may be generally represented at 4. The shaft 2 is preferably mounted in bearings such as indicated at 5, which bearings will be suitable to take a certain amount of thrust which is incident to the operation of the transmission mechanism.

The shafts 1 and 2 are in axial alinement.

Upon the end of the shaft 1 there is mounted a fixture which has a central portion 6, that is cup-shaped to receive a portion of the spherical surface of a ball 7. The fixture before referred to, has a base portion 8, which has two or more arms 9, extending therefrom. These arms are preferably arc-shaped.

Between the shafts 1 and 2 there is located a wabbler disk 10. This disk has a central portion 11 which receives a portion of the ball 7 so that a universal bearing contact is obtained between the wabbler disk 10 and the fixture 8 carried by the shaft 1. The wabbler 10 has an extending post formed with a partly spherical head 12 which is adapted to be engaged in a grooved out portion 15, formed in a head 14, which is carried upon the end of the shaft 2.

It will be noted that the axis of the alined shafts passes through the center of the disk 10.

The disk 10 is provided with a plurality of openings $10^a$ through which extend the arms 9, thereby forming a driving connection between the shaft 1 and disk 10.

Surrounding the bearing in which the shaft 1 is mounted, is a magnet coil 15, this magnet coil being entirely surrounded by the iron frame of the bracket 3, except on the front face thereof. The front portion of the cavity in the bracket 3 in which the coil 15 rests, is closed by means of any suitable disk such as indicated at 16, this disk serving to keep oil and dirt from the coil.

The outer wall 17 of the bracket 3 in which the coil 15 is inclosed, is cylindrical, and closely engaging with this wall is a cylindrical shell 18 which has an inwardly extending flange 19, this flange extending over and overlapping as it were, portions of the coil 15. The flange 19 is adapted to be contacted by the disk 10 as indicated in Fig. 1, and as the disk is caused to rotate by the rotation of the shaft 1, the disk 10 will always maintain a point of contact with the flange 19 and effect a wabbling movement with respect thereto.

The coil 15 is adapted to be connected with a source of electrical energy, not shown, so that when the coil 15 is energized, the magnetic field is set up by the flow of the current in the coil. The disk 10, or at least a portion thereof in effect forms an armature for the electro-magnet which is thus formed by the coil and the iron casing parts which inclose it, and the flux set up by the magnet is confined, in large part, to the casing which contains the magnet, the shaft 1, the wabbler 10, and that portion of the cylindrical member 18, the flange of which is contacted by the wabbler 10. Thus at any point upon the flange 19 with which the wabbler may be in contact as it turns, there will be a heavy flux exerting its pull to hold the wabbler 10 against the flange 19 and prevent any slippage of the wabbler 10 with respect to the flange 19.

As the shaft 2 is rotated, it causes the disk 10 to rotate, and as the disk 10 rotates, the periphery of the disk 10 travels upon the flange 19 engaging at one point, but due to the inclined position of the wabbler 10 and the wabbling action thereof, the full speed of rotation of the shaft 2 is not transmitted to the shaft 1, but the speed of the shaft 1 which is rotated as the shaft 2 is rotated, is less than the speed of the shaft 2, and the ratio of the speed of the shaft 2 and the shaft 1 is dependent upon the angular position of the wabbler 10. Therefore by varying the angular position of the disk 10 with respect to the axis of the shafts 1 and 2, the relative speed between these shafts may be varied.

In order to easily accomplish such variation of the angular position of the wabbler 10, I have provided a construction whereby the cylindrical member 18 may be moved with respect to the magnet so as to vary the inclination of the disk 10. This is accomplished in the following manner. Surrounding the member 18 and the wabbler disk and parts associated therewith, is a casing 20, which at one portion is rotatably mounted upon the bracket 4, and at the other end thereof has a rotative sliding engagement with the outer wall of the cylindrical member 18. This casing 20 serves as a casing to hold and protect the transmission mechanism against injury.

The cylindrical member 18 is provided with a plurality of pins, one of which is indicated at 21. Each pin engages with a slot 22 so that the cylindrical member 18 may be moved outwardly or inwardly with respect to the portion upon which it is mounted, but is not rotatable with respect thereto.

The cylindrical member 18 also is provided with one or more pins such as indicated at 23. Each pin 23 extends through a slot such as indicated at 24 in Fig. 3. As will be seen, the slot is a diagonal slot, and therefore as the casing 20 may be rotated it will cause the pin 23 to move in the slot 24, and so cause movement of the cylindrical member 18. This movement of the cylindrical member 18 forces the wabbler member 10 to move toward or from a vertical position, and inasmuch as the ball portion 12 of the wabbler is mounted in a slot of proper design, it permits the ball member 12 to move toward and away from the axis of the shaft 2. Thus by rotating the casing 20, a variation in speed between the shafts 1 and 2 may be readily accomplished while driving the shaft 2 at a constant speed.

The casing 20 may be arranged to be turned by any desired mechanism, and for the purpose I have shown a handle 25, suitably mounted upon the casing. With the handle is associated a spring pressed pawl 26 which is adapted to engage with any one of a number of depressions 27, which holds the casing member 20 in its adjusted position.

In the form shown in Fig. 5, the same general arrangement of elements obtains as heretofore explained, but with specified details of the construction changed. In this form of the device a fixed speed relationship is obtained by the construction shown.

The shaft 30 is the driving shaft, and the shaft 31 is the driven shaft. The supports for the shafts are the same as heretofore explained, and the coil 32 is supported in a casing having a wall 33 as before explained. The cylindrical member 34 has the inwardly extending flange 35, as before explained, and against the flange 35 the wabbler 36 engages and wabbles in the same manner as heretofore explained.

Upon the end of the shaft 30 there is a fixture 37 which is provided with extending arms 38, each of these arms being formed with a slot indicated at 39 in Fig. 6. The wabbler is provided with a corresponding number of openings 40, through which the arms 38 are adapted to extend. Pins 41 are secured in the wabbler, and extend transversely of the openings 40, these pins also extending through the slots 39 formed in the arms 38, thereby effecting a driving relationship between the shaft 30 and the wabbler 36. The fixture 37 has a cup-shaped portion which receives a portion of the surface of a ball 42, and the ball also is received by a portion of the surface of the wabbler 36, thus forming a universal bearing between the two adjacent members. A portion of the wabbler 36 is, as before explained, provided with a partly spherical head 43 which engages in a suitable opening formed in the head 44 of the shaft 31.

In the drawing as shown, the angular relationship between the axis of the shafts 30 and 31, and the axis of the wabbler 36 is predetermined, and the parts are assembled in accordance with this determination.

The operation of the device last explained, is the same so far as the wabbling action is concerned, as the device previously explained.

Having described my invention what I claim is:

1. In a power transmitting mechanism, the combination of a driving shaft and a driven shaft, a wabbler disk located between adjacent ends of the two shafts, a driving connection between the driving shaft and the wabbler disk, and a driving connection between the wabbler disk and the driven shaft, a body having an annular surface against which the wabbler disk may wabble, and means for setting up a magnetic flux to hold the contacting portion of the wabbler disk against the surface of the body which it contacts.

2. A power transmitting device comprising a driving shaft and a driven shaft, a wabbler disk located between the two shafts, a driving connection between the driving shaft and the wabbler disk, a projection upon said wabbler disk located at substantially the central portion thereof, said projection having a driving connection with the driven shaft, a body having an annular surface against which the wabbler disk is adapted to wabble, and means for setting up a magnetic attraction between the portion of the wabbler disk contacting the body having the annular surface and the said body.

3. In a power transmission mechanism, the combination of a driving shaft and a driven shaft, a wabbler disk located between the said shafts, a driving connection between the wabbler disk and the driving shaft, a driving connection between the wabbler disk and the driven shaft, a magnet, a portion of which is formed with an annular surface against which the wabbler disk is adapted to wabble, whereby the magnetic attraction between the electro-magnet and the wabbler disk holds the wabbler to the surface of the magnet and against slippage as it rotates against the said surface.

4. In a power transmitting mechanism, the combination of a driving shaft and a driven shaft, a wabbler between the said shafts, driving connections between the driving shaft and the wabbler, and driving connection between the wabbler and the driven shaft, an electro-magnet having a movable pole member, said pole member having an annular surface against which the wabbler is adapted to wabble, and means for moving the pole surface thereby to vary the degree of angular relationship between the axis of the wabbler and the axis of the two shafts.

5. In a transmission mechanism, the combination of a driving shaft and a driven shaft, a wabbler disk between the shafts, a driving connection between the driving shaft and the wabbler disk, and a driving connection between the wabbler disk and the driven shaft, an electro-magnet surrounding one of the shafts, a sleeve member surrounding the electro-magnet and forming a movable pole face for the electro-magnet, said pole face having an annular surface against which the wabbler is adapted to wabble, and means for moving the said cylindrical member thereby to vary the degree of angularity between the axis of the wabbler and the axis of the said shafts.

6. In a power transmitting mechanism, the combination of a driving shaft and a driven shaft, a wabbler between said shafts, driving connections between the driving shaft and the wabbler, and driving connections between the wabbler and the driven shaft, an electro-magnet surrounding one of the shafts, a slidable member forming a pole face for the electro-magnet, said slidable member having an annular portion against which the wabbler is adapted to wabble, and inter-dependent means upon the electro-magnet and the sliding member, whereby the sliding member is prevented from rotating, but is permitted to slide upon the electro-magnet, a casing surrounding the sliding member, a cam groove in said casing, a pin carried by the said sliding member and extending into the said cam groove whereby as the casing is rotated the sliding member is caused to slide upon the electro-magnet thereby varying the degree of angularity between the axis of the wabbler and the axis of the said shafts.

7. In a transmission mechanism, the combination of a driving shaft and a driven shaft, a wabbler located between the said shafts, said wabbler being provided with openings in a portion thereof, arms carried by the driving shaft and adapted to extend through the openings in the wabbler thereby to form a driving connection between the driving shaft and the wabbler, a driving connection between the wabbler and the driven shaft, and a member having an annular surface against which annular surface the wabbler is adapted to wabble.

8. In a transmission mechanism, the combination of a driving shaft and a driven shaft which are in alinement, a wabbler located between the said shafts, a head member carried by the driving shaft, said head member having a spherical depression, the central portion of the wabbler also having a spherical depression, a spherical member engaging in the said openings, arms carried by the said head member, the wabbler member being provided with openings through which the said arms extend thereby to form a driving connection between the driving shaft and the wabbler disk, a driving connection between the wabbler disk and the driven shaft, and a member having an annular surface against which the wabbler disk may wabble.

In testimony whereof I hereunto affix my signature.

FRANK B. RAE.